United States Patent [19]

Shopland

[11] 4,395,908
[45] Aug. 2, 1983

[54] MEANS FOR ADJUSTING THE SENSITIVITY OF A CRYSTAL DETECTOR

[75] Inventor: Robert C. Shopland, Houston, Tex.

[73] Assignee: Western Geophysical Co. of America, Houston, Tex.

[21] Appl. No.: 296,769

[22] Filed: Aug. 27, 1981

[51] Int. Cl.³ .............................................. G01P 15/09
[52] U.S. Cl. .............................. 73/516 LM; 310/329; 310/331; 367/157; 367/163
[58] Field of Search ........... 73/516 LM, DIG. 4, 652; 310/329, 324; 367/163, 166, 167, 174, 171, 157; 179/110 A, 181 R, 180; 181/158, 171, 172

[56] References Cited

U.S. PATENT DOCUMENTS

| | | | |
|---|---|---|---|
| 1,340,471 | 5/1920 | Williamson | 179/180 |
| 1,401,024 | 12/1921 | Wood et al. | 367/174 |
| 1,478,709 | 12/1923 | Gernsback | 179/181 |
| 2,448,365 | 8/1948 | Gillespie | 367/150 |
| 2,726,074 | 12/1955 | Ketchledge | 310/329 |
| 3,187,300 | 6/1965 | Brate | 310/329 |
| 4,334,296 | 6/1982 | Hall | 367/166 |
| 4,373,119 | 2/1983 | Feder | 310/324 |

Primary Examiner—Steven L. Stephan
Assistant Examiner—J. Chapman
Attorney, Agent, or Firm—William A. Knox

[57] ABSTRACT

A twin-transducer seismic detector includes a hollow housing closed at each end by a diaphragm-type transducer. A deformable retaining member is pressed against the perimeter of each transducer. An adjustable force is applied to at least one of the deformable members to cause the member to flatten against the transducer. As the deformable member becomes flattened, it reduces the effective area of the transducer and hence alters its compliance and sensitivity. The applied force is adjusted so as to match the sensitivity of one transducer to that of the other transducer.

6 Claims, 3 Drawing Figures

MEANS FOR ADJUSTING THE SENSITIVITY OF A CRYSTAL DETECTOR

BACKGROUND OF THE INVENTION

1. Field of the Invention

This invention is concerned with a means for adjusting the sensitivity of a ceramic-crystal seismic detector.

2. Discussion of the Prior Art

This invention represents an improvement in the method of manufacture and tuning of twin-crystal seismic detectors such as hydrophones or accelerometers for example.

In its simplest form, a detector consists of a hollow housing, usually cylindrical, of suitable material. The top and bottom of the housing are closed by thin metal diaphragms, each supporting a disc-shaped piezo-electric ceramic crystal element cemented to one side thereof. Suitable conductors, electrically connected to the crystal elements, provide means for transmitting the signals from the crystal to the outside world.

In the manufacture of the detector, it is customary to secure the metal diaphragms in place by simply crimping the ends of the housing over the diaphragms. Alternatively the diaphragms were cemented in place or ultrasonically welded.

It is important that the sensitivities of the two crystal elements be matched, preferably within one percent or less. For that reason, it was necessary to hand-pick each pair of crystal elements before assembling the detector. Hand selection necessarily increased production costs.

An additional problem arose in that, once the crystal elements were permanently fixed in place during assembly, a cracked crystal could not later be replaced. The detector was therefore discarded.

In another application, using single-element detectors, a related problem arises when a plurality of such detetors are electrically coupled together as units of an array. In such an array, it is preferable that all of the units have matched sensitivities. Here again, it was necessary to hand-pick the detectors destined to form the units of a proposed array.

SUMMARY OF THE INVENTION

It is an object of this invention to provide a means for matching the sensitivity of a pair of piezo-electric elements of a seismic detector after the detector has been assembled. Another object of this invention is to provide a detector having at least one replaceable crystal element.

In a preferred embodiment of this invention, I provide a housing for receiving at each end a piezo electric crystal element mounted on a supporting diaphragm. A resilient deformable member contacts the diaphragm to support the diaphragms in the housing. A sensitivity adjusting means applies a variable force to the deformable member.

In accordance with an aspect of this invention the deformable member changes the effective radius of the diaphragms in proportion to the applied force, thereby to change the compliance of the diaphragm.

In accordance with another aspect of this invention, the deformable member is pressed against the perimeter of the diaphragm by a threaded end cap having micrometer-type indices to quantitatively determine the amount of applied pressure.

In accordance with yet another aspect of this invention, the deformable member is positioned between a bezel ring and the crystal-supporting diaphragm to alter the radius of the diaphragm when said member is deformed by pressure applied against said bezel ring.

In accordance with another aspect of this invention, the bezel ring, deformable member and pressure cap are removable so that the crystal element can be replaced.

In another embodiment of this invention, I contemplate providing a twin-crystal accelerometer having a liquid mass contained between the crystal elements, each crystal element being associated with a means for matching the sensitivity of the crystal elements.

DETAILED DESCRIPTION OF THE PREFERRED EMBODIMENT

Figure 1:
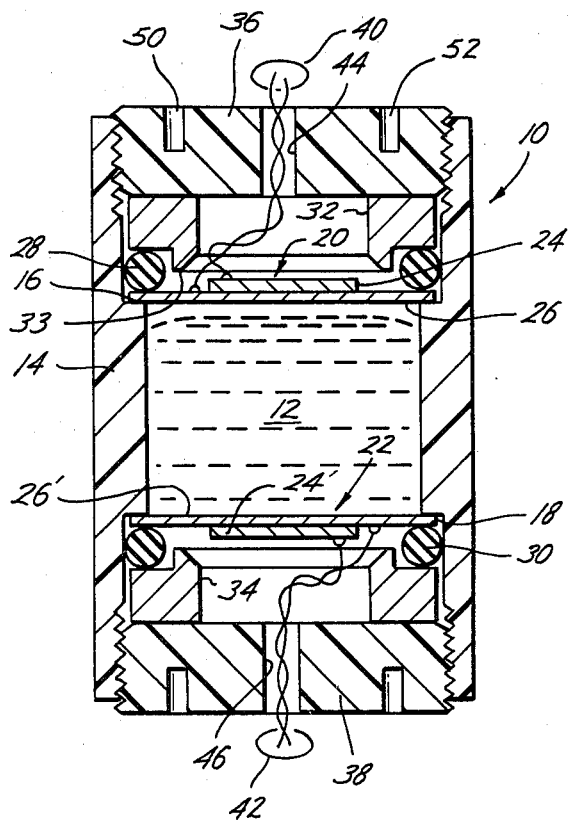
FIG. 1 is a skeletonized view of an exemplary twin-crystal accelerometer having a liquid inertial mass.

This invention represents an improvement in the manufacture of seismic detectors having one or more piezo electric crystals as active elements. The improvement resides in providing a convenient means for adjusting the sensitivity of the active elements in those circumstances where matched sensitivities are required of those elements. One such device might be a twin-crystal accelerometer as shown in FIG. 1 by way of example but not by way of limitation.

Accelerometer 10 consists of a housing 14, preferably of plastic such as PVC having inner top and bottom shoulders 16 and 18. Transducers 20 and 22, consisting of ceramic piezo-electric crystals 24, 24' and thin supporting diaphragms 26, 26', rest on shoulders 16 and 18. Transducers 20 and 22 are held in place by deformable members 28 and 30, bezel rings 32 and 34 for urging the deformable members 28 and 30 against said transducers, and threaded end caps 36 and 38. A volume 12 of a heavy liquid such as mercury nearly fills housing 14 between transducers 20 and 22. Twisted-pair conductors 40 and 42 transmit the electrical signals from transducers 20 and 22 to the outside world through passageways 44 and 46 in end caps 36 and 38. The entire assembly may be contained within any desired type of sealed outer housing that is well known to the art but which is not shown to avoid unnecessary detail in the drawing.

Piezo-electric accelererometers fall into three types: Compression, shear and bender.

In commercial seismic exploration, bender-type piezo-electric crystals are used. A piezo-electric crystal, in the form of a thin disc, is cemented to a thin metal diaphragm made of such material as beryllium-copper. An accelerating force presses the diaphragm against an inertial mass, causing the crystal element to flex. The output signal due to flexure of the diaphragm-crystal element is proportional to said force.

In a batch of mass-produced transducers, their sensitivities may vary several percent from an average value for the batch. Instead of hand-selecting a pair of transducers for use in assembling a detector I prefer to use production-run transducers and then to provide a means for matching their sensitivities after assembly. Transducer sensitivity can be adjusted by changing the mass loading of the crystal element or by changing the spring constant or compliance of the supporting diaphragm. I prefer to follow the latter course, i.e., to adjust the diaphragm compliance.

Figure 2:
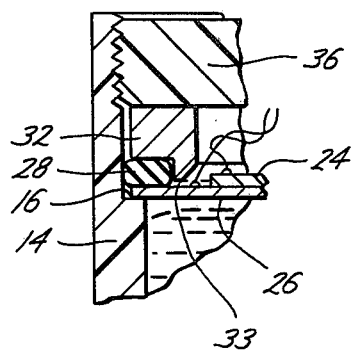
FIG. 2 is a partial detail view of a deformed resilient element.

The spring constant can be changed by altering the effective radius of the metal diaphragm, thus varying its area and compliance. The radius is altered, according to my invention, by applying a variable pressure against a resilient deformable member such as an O-ring 28 that bears against the perimeter of the diaphragm. A desired pressure is applied by rotating a threaded end cap 36 clockwise or counter clockwise depending upon whether the pressure is to be increased or decreased. Increased pressure tends to flatten the O-ring, giving it an ovoid cross-section. As the O-ring becomes more flattened, it necessarily spreads out and reduces the effective radius of diaphragm 26 as shown in FIG. 2. The combination of increased pressure and decreased effective radius reduces the compliance of the diaphragm and decreases the sensitivity. It should be observed that the resilient deformable member does not apply a compressive force to the crystal itself, it merely alters the compliance or spring constant of the transducer taken as a whole. It should also be observed that length of the bottom edge 33 of bezel 32 is restricted so that O-ring 28 has room to deform under a deforming force applied thereto.

Figure 3:
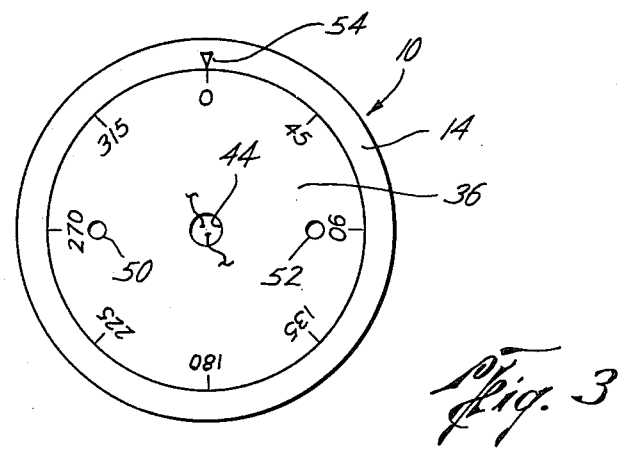
FIG. 3 is an end view of the accelerometer.

Threaded end caps 36 and 38 have sockets 50 and 52, as shown in FIG. 3, in their external end faces to receive the prongs of a conventional spanner for turning the end caps during tension adjustment. Alternatively a screw driver slot could be provided. Angular calibration marks are etched on the end faces of the threaded end caps 36 and 38 so that micrometric reproducible tension settings may be made with respect to an index 54. The pitch of the threads of end caps 36, 38 and at the ends of housing 14 is not critical. Angular calibration marks spaced five degrees apart are adequate. I have found that with a pitch of 14 threads per inch, variations in relative sensitivity from 6 to 10% are possible by making a rotational adjustment of an end cap of less than 45 degrees.

In operation, to match sensitivities of a pair of transducers, I customarily position the accelerometer so that housing 14 is horizontal and the liquid inertial mass contacts both transducers substantially equally. The transducers are electrically coupled in opposition and driven by an accelerating force at constant velocity, at a discrete frequency. Optimum sensitivity match is achieved when the differential output voltage reading on a digital voltmeter is minimized by changing compressional forces on one or both diaphragms by rotation of the end caps. I prefer to make sensitivity checks at several discrete acceleration-force frequencies distributed over the spectral band of interest. The sensitivity match would be optimized over that band.

I claim as my invention:

1. In a detector of the type including a housing having an internal chamber that is closed at each end by a diaphragm-type transducer, means for matching the sensitivity of said transducers, comprising:
   a shoulder at each of said housing for receiving each said transducer;
   resilient deformable members contacting said transducers externally of said chamber;
   means for urging said resilient deformable members against said transducers; and
   means for applying an adjustable deforming force to at least one of said deformable members through said urging means to alter the compliance of the corresponding transducer until its sensitivity matches the sensitivity of the other transducer.

2. The transducer sensitivity-matching means as defined by claim 1, comprising:
   threaded, rotatable end caps, mating with corresponding threads in the ends of said housing for applying said deforming force to said urging means and thence to said deformable members.

3. The transducer sensitivity-matching means as defined in claim 1 wherein said deformable members flatten against said transducers and spread under the pressure of a deforming force thereby altering the compliance of said transducers.

4. The transducer sensitivity-matching means as defined in claim 1 wherein increased deforming forces flatten and spread said deformable members against said transducers to reduce the area of said transducers thereby to reduce the sensitivity thereof.

5. In an accelerometer of the type including a housing closed at each end by a diaphragm-type transducer to form a chamber for containing a volume of a liquid inertia mass internally of said housing between said transducers, the improvement comprising:
   resilient deformable ring members contacting said transducers around the perimeters thereof, externally of said chamber;
   bezel rings for urging said deformable ring members against said transducers;
   threaded, rotatable end caps for pressing said bezel rings against said deformable ring members to apply an adjustable deforming force to said ring members so that they spread out to alter the compliance of said transducers.

6. The improved accelerometer as defined in claim 5, comprising:
   micrometric indications on at least one of said end caps to provide means for quantitative measure of said tensioning force.

* * * * *